(No Model.) 2 Sheets—Sheet 1.
O. O. OZIAS.
SCALE.
No. 596,760. Patented Jan. 4, 1898.
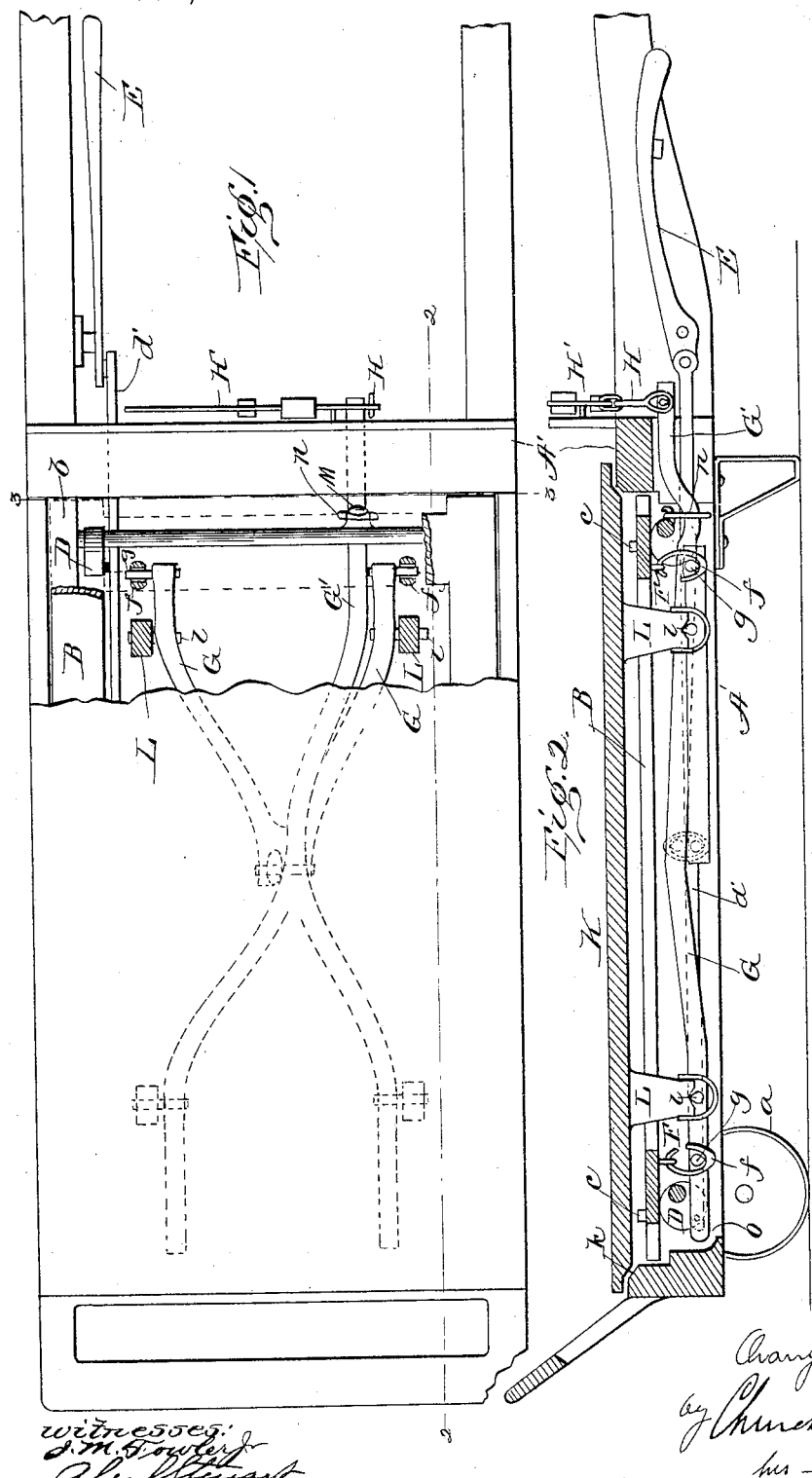
Witnesses:
J. M. Fowler
Alex. Stuart
Inventor
Orange O. Ozias
by Church & Church
his Attorneys.

(No Model.) 2 Sheets—Sheet 2.

O. O. OZIAS.
SCALE.

No. 596,760. Patented Jan. 4, 1898.

Witnesses:
J. M. Fowler Jr.
Aly Stewart

Inventor
Orange O. Ozias,
by Church & Church
his Attorneys

THE NORRIS PETERS CO., PHOTO-LITHO., WASHINGTON, D. C.

UNITED STATES PATENT OFFICE.

ORANGE O. OZIAS, OF DAYTON, OHIO.

SCALE.

SPECIFICATION forming part of Letters Patent No. 596,760, dated January 4, 1898.

Application filed March 20, 1896. Serial No. 584,158. (No model.)

*To all whom it may concern:*

Be it known that I, ORANGE O. OZIAS, of Dayton, county of Montgomery, State of Ohio, have invented certain new and useful Improvements in Scales; and I do hereby declare the following to be a full, clear, and exact description of the same, reference being had to the accompanying drawings, forming a part thereof, and to the letters of reference marked thereon.

This invention relates particularly to that class of scales which are combined with the movable base or truck; and the object of the invention is to provide the structure wherein the bearings and more delicate parts are effectually protected against injury by rough handling or when the truck and scale are being moved from place to place, a further object of this invention being to produce a structure which, if desired, may be used for trucking purposes for moving goods about without injury to the scale.

The invention consists, broadly, in mounting on the movable or wheel base-frame a secondary frame which is vertically adjustable and adapted by its movement to either allow the platform or receiver for the goods to rest solidly upon the base-frame or to elevate the said platform and establish a connection between the same and the multiplying-levers of the scale mechanism, and, if desired, to also establish the connection between the said multiplying-levers and the scale-beam, one or both said connections being entirely relieved from strain when the intermediate or supplemental frame is in its lowered position.

The invention further consists of certain novel details of construction and combinations and arrangements of parts, all as will be now described, and pointed out particularly in the appended claims.

Figure 3:
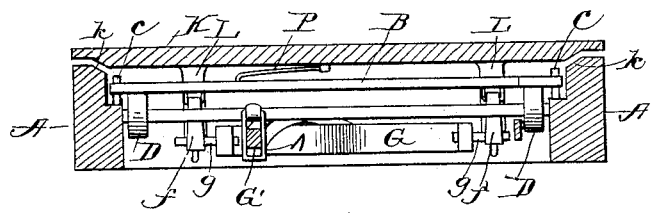
Figure 4:
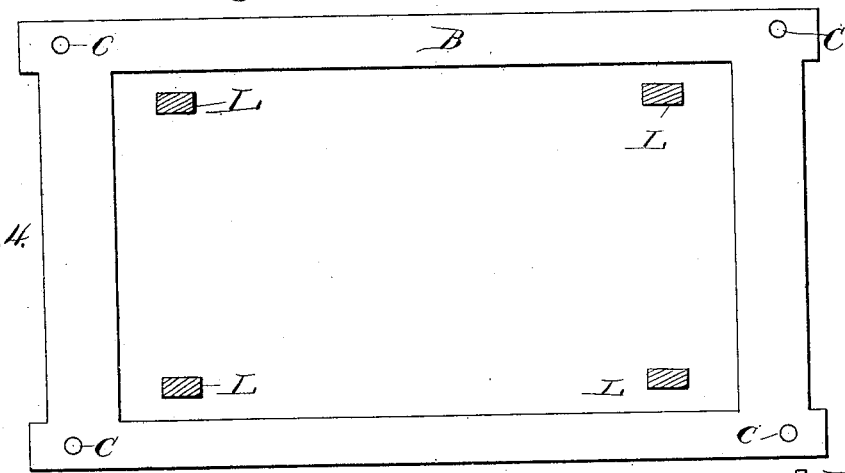
Figure 5:
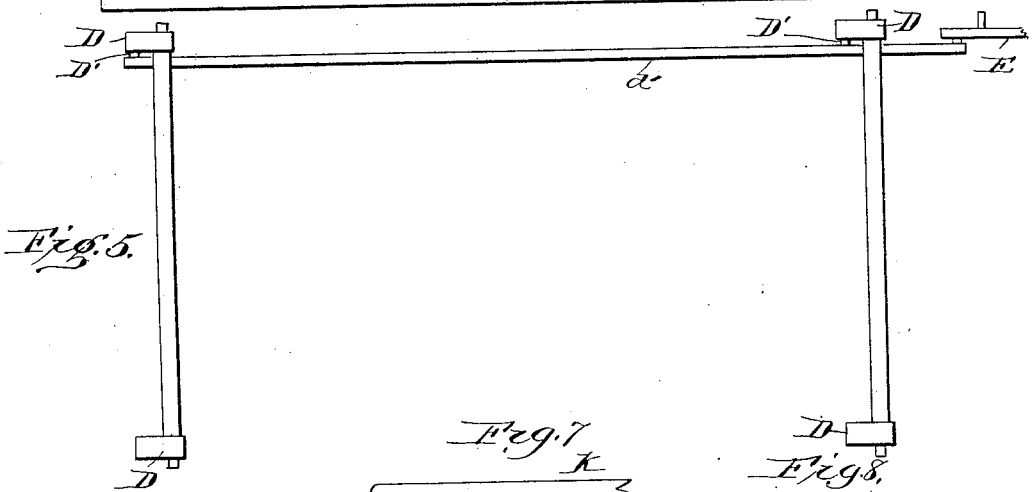
Figure 6:
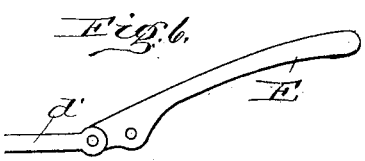
Figure 7:
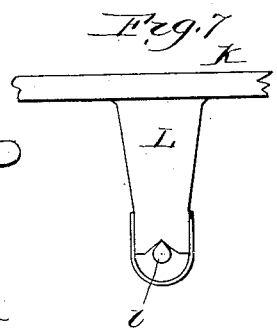
Figure 8:
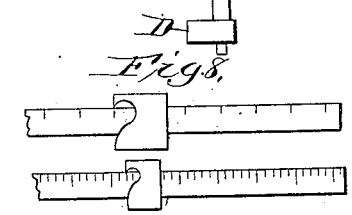

Referring to the accompanying drawings, Figure 1 is the top plan view of an ordinary hand-truck having my invention applied thereto. Fig. 2 is a longitudinal section through the weighing mechanism of the same, looking at the mechanism beneath the platform from the right-hand end of Fig. 1. Fig. 3 is the transverse section. Fig. 4 is the plan of the supplemental frame, showing the feet of the platform in section in order to illustrate the relative positions of the two parts. Fig. 5 is a top plan view of the supplemental frame-elevating mechanism. Fig. 6 is a detail of the operating mechanism for the elevating mechanism. Fig. 7 is a detail of the front of the platform-feet. Fig. 8 is a detail of the weighing-beam.

Like letters of reference in the several figures indicate the same parts.

While I have shown and will describe my invention in detail as applied to an ordinary hand-truck having wheels at one end only and handles at the opposite end, it will be understood that the invention may be applied to any desired or ordinary style of truck or base framing which is adapted to be moved about from place to place on wheels or otherwise, and hence I do not wish to be limited in this particular.

In the construction illustrated in the drawings the letter A indicates the frame of the hand-truck, consisting of handles or side pieces having the usual small truck-wheels $a$ journaled between them or at any desired point near one end, said side pieces being held together by cross-pieces, as a cross-piece A'. This structure forms a rectangular base-framing, which is the preferred form, and it is suitably recessed to form the seat $b$, in which the supplemental or elevating frame B may normally rest and be held against lateral movement in any direction. This supplemental or elevating frame is (as may be inferred from its name) capable of being given a vertical movement, and suitable guides are provided for directing such movements, these guides in the preferred form being simple pins $c$, passed through apertures C in the corners of the supplemental or elevating frame, although any other desired form of guiding mechanism may be employed. For the purpose of raising and lowering this supplemental or elevating frame I preferably provide small cams D with very gradually-inclined faces, Fig. 5, which cams are supported on the base-frame and engage the under faces of the supplemental or elevating frame at four different points, the cams being connected across the frame by shafts or rods $d$, and those at opposite ends are connected for simultaneous operation by connecting-rod $d'$, engaging crank-pins D'. This connecting-rod $d'$ is also preferably extended out along one of the side pieces or handles and constitutes the means through which the power is transmitted to the cams for operating them, for which purpose on one of the side pieces I pivot a handle E, to which the end of the connecting-rod $d'$ is journaled. I prefer to give the cams substantially a one-half turn in lifting and lowering the supplemental frame, and when in their elevated position the connection between the handle E and connecting-rod $d'$ moves across the pivotal center of the handle and holds the parts in this position, thus dispensing with the necessity of employing a catch for holding the handle, or, at least, more than a simple friction device, if it is desired to prevent looseness at this point.

The supplemental or elevating frame at four properly-spaced points is provided on its under side with hooks or loops F, in which the loops $f$ for supporting the knife-edge bearings $g$ of the multiplying-levers G of the scale take their bearings. The multiplying-levers are thus located under the supplemental or elevating frame, and they are provided with an extension G', to which the connecting-rod H of the beam or beams H' is united in the ordinary manner. These beams H' may be of any ordinary construction; but inasmuch as the scale is designed for weighing relatively heavy weights I prefer to employ two beams of usual construction and as ordinarily employed, one having a very heavy weight thereon with a few graduations indicating heavy weights and the other having the lighter weight with wider graduations for indicating fractional parts of the graduations on the other beam, Fig. 8. Such construction, however, is well known and forms no part of my present invention.

In addition to the seat for the supplemental frame the base-frame is provided with the second seat $k$, in which the platform or receiver K for the goods to be weighed or upon which any goods are placed comes to rest when in its lowered position. This seat holds the platform against transverse movement when lowered, but when lifted (as will be presently described) it rides entirely free from this seat. The platform K is provided with four depending legs L, having the usual V-shaped bearings at the lower end, adapted to rest upon four corresponding knife-edge bearings $l$ on the multiplying-levers of the scale mechanism. With said construction when the parts are in normal position with the supplemental or elevating frame and the platform lowered they are so adjusted in relation to each other as that the knife-edge bearings are free from the V-bearings in the legs L, and consequently articles placed on the platform do not throw any strain at all on the weighing mechanism, such strain being entirely borne by the base-frame. When I raise the supplemental or elevating frame, it first takes up the slack in the loops F $f$ and raises the multiplying-levers evenly and regularly, and as the movement continues the knife-edge bearings $l$ engage the depending legs of the platform and the latter is elevated into weighing position.

To further interrupt the connection between the platform and scale-beam, so as to entirely relieve the connection between the levers and beams, I preferably, though not necessarily, form the crank-arm M on one of the shafts $d$ and provide this crank M with a depending loop $n$, passing loosely around the extension D' of the multiplying-levers. The movement of the mechanism and rotation of the shaft $d$ is sufficient, when the supplemental frame is lowered, to throw the loop $n$ into engagement with the under side of the extension G', elevating said extension sufficiently to relieve the connection between said extension and beams, as will be readily understood by those skilled in the art.

With the further view of giving additional support to the multiplying-levers when in their lowered position and in order to prevent longitudinal play when in this position, when the truck is taken up into position for trundling, I provide seats $o$ in the base-framing, in which the ends of the multiplying-levers come to rest when lowered, and in order to prevent lateral play of the platform when elevated and to guide the same in its vertical movements I provide the usual hooks P at each end of the same.

Instead of forming a recessed seat, strictly speaking, in the base-frame for the elevating or supplemental frame said elevating or supplemental frame may find this seat on the elevating mechanism or cams, which when in their lowered position will form a seat, answering all the purposes of a recess in the base-frame itself, and hence I do not wish to be limited in my claims to the particular construction shown.

Having thus described my invention, what I claim as new, and desire to secure by Letters Patent, is—

1. In a scale adapted to be moved from place to place in use the combination with the portable base-frame, of the vertically-adjustable or supplemental elevating-frame, the platform having a fixed support when in lowered position, the beam and the multiplying-levers entirely supported by the supplemental or elevating frame when elevated and adapted when elevated by said frame to engage and lift the platform, substantially as described.

2. In a truck or portable scale the combination with the portable base-frame and platform seating thereon when in lowered position, of a supplemental or elevating frame, multiplying-levers entirely supported by said supplemental or elevating frame when elevated and engaging the platform when elevated to raise the same into weighing position, the beam and operating mechanism for raising the supplemental or elevating frame, substantially as described.

3. In a truck or portable scale, the combination with the base-frame and the platform resting on said base-frame when in its lowered position, of a supplemental or elevating frame also resting on said base-frame when in its lowered position, mechanism for lifting said supplemental frame, the beam and multiplying-levers suspended from and entirely supported by the supplemental frame when elevated and when elevated thereby, engaging and elevating the platform into weighing position, substantially as described.

4. In a truck or portable scale, the combination with the base-frame having seats for the supplemental frame and for the platform, of the supplemental frame and platform resting in said seats when in lowered position, guides for controlling the vertical movement of the supplemental frame, depending feet on the platform, a beam, multiplying-levers entirely supported by supplemental frame when elevated and engaging the feet on the platform when elevated and mechanism for elevating this supplemental frame, substantially as described.

5. In a truck or portable scale, the combination of the base-frame, the supplemental frame seating thereon when in lowered position, elevating mechanism interposed between said supplemental and base frame and operating to separate the two while maintaining their parallelism and the platform seating on the base-frame and having depending legs, of the multiplying-levers suspended from the supplemental frame and having bearings cooperating with the depending feet of the platform to elevate the latter when elevated by the upward movement of the supplemental frame and a beam controlled by the multiplying-levers, substantially as described.

6. In a truck or portable scale, the combination with the base-frame, multiplying-levers seated in said frame when in lowered position, and a supplemental or elevating frame, also seated in said base-frame when in lowered position and supporting the multiplying-levers when in elevated position, of a platform seated in said base-frame when in lowered position and having depending feet, with which the multiplying-levers engage when elevated, whereby the platform is raised into weighing position, and a beam controlled by the multiplying-levers, substantially as described.

7. In a truck or portable scale, the combination of the base-frame, supplemental frame seated therein and carrying multiplying-levers, platform seated on base-frame and adapted to be lifted by the multiplying-levers, of the series of cams interposed between the base-frame and supplemental frame, the rod connecting said cams for simultaneous operation and the pivotal handle for operating said rods, substantially as described.

8. In a truck or portable scale, the combination with the base-frame, the supplemental or elevating frame seated thereon when lowered, the platform also seated thereon when lowered, and the multiplying-levers suspended from the supplemental frame and engaging the platform to elevate the latter into weighing position, and the elevating mechanism for raising the supplemental frame and a connection between the elevating mechanism and the multiplying-levers for throwing said multiplying-levers out of connection when the supplemental frame is lowered, substantially as subscribed.

O. O. OZIAS.

Witnesses:
    ALEX. S. STUART,
    CHARLES W. JAMES.